US007961076B2

(12) United States Patent
Kelley et al.

(10) Patent No.: US 7,961,076 B2
(45) Date of Patent: Jun. 14, 2011

(54) METHODS AND APPARATUSES FOR REMOTE CONTROL OF VEHICLE DEVICES AND VEHICLE LOCK-OUT NOTIFICATION

(75) Inventors: Nia L. Kelley, Austin, TX (US); Guillermo J. Silva, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 11/364,622

(22) Filed: Feb. 28, 2006

(65) Prior Publication Data
US 2007/0200671 A1   Aug. 30, 2007

(51) Int. Cl.
G05B 19/00 (2006.01)
G06F 7/00 (2006.01)
H04B 1/00 (2006.01)
H04Q 1/00 (2006.01)

(52) U.S. Cl. .................. 340/5.52; 340/426.13; 340/5.62; 340/5.72

(58) Field of Classification Search .................. 340/5.52, 340/426.13, 5.62–5.64, 5.72, 426.6; 455/41.2, 455/410, 420; 380/45, 25; 367/198; 705/76, 705/16, 26
See application file for complete search history.

(56) References Cited

U.S. PATENT DOCUMENTS

| | | | |
|---|---|---|---|
| 4,685,313 A | | 8/1987 | Neyret |
| 4,761,645 A | | 8/1988 | Mochida |
| 5,144,667 A | * | 9/1992 | Pogue et al. .................... 380/45 |
| 5,339,073 A | | 8/1994 | Dodd et al. |
| 5,477,214 A | | 12/1995 | Bartel |
| 5,499,022 A | * | 3/1996 | Boschini ...................... 340/5.62 |
| 5,552,641 A | | 9/1996 | Fischer et al. |
| 5,552,789 A | | 9/1996 | Schuermann |
| 5,557,254 A | | 9/1996 | Johnson et al. |
| 5,561,420 A | | 10/1996 | Kleefeldt et al. |
| 5,615,268 A | | 3/1997 | Bisbee et al. |
| 5,680,094 A | | 10/1997 | Guim et al. |
| 5,708,712 A | | 1/1998 | Brinkmeyer et al. |

(Continued)

FOREIGN PATENT DOCUMENTS

EP   1 191 486 A1   3/2002

(Continued)

OTHER PUBLICATIONS

U.S. Appl. No. 10/931,515, filed Aug. 31, 2004, Brannon et al.

(Continued)

*Primary Examiner* — Brian A Zimmerman
*Assistant Examiner* — Nam V Nguyen
(74) *Attorney, Agent, or Firm* — Stephen J. Walder, Jr.; Libby Z. Toub

(57) ABSTRACT

Methods, systems, and media for remote control of a vehicle device and vehicle lockout notification are disclosed. Embodiments comprise a method of creating a secure bidirectional communication link between a remote access device and a central locking unit (CLU) of a vehicle, enabling the central locking unit to authenticate a user of the remote access device to manipulate a device of the vehicle. In some embodiments, the CLU may wait for an access attempt from a mobile device. In other embodiments, the CLU monitor vehicle conditions, detect a lockout condition, and alert the user before authenticating and granting vehicle access. Embodiments utilize private and shared key encryption methods to facilitate securely passing an access code between the CLU and the remote access device. Some embodiments authenticate the user by voice verification, while other embodiments may use personal identification numbers.

19 Claims, 11 Drawing Sheets

U.S. PATENT DOCUMENTS

| | | | |
|---|---|---|---|
| 5,748,738 A | 5/1998 | Bisbee et al. | |
| 5,923,756 A | 7/1999 | Shambroom | |
| 5,969,597 A | 10/1999 | Weigl et al. | |
| 5,986,543 A * | 11/1999 | Johnson | 340/426.19 |
| 6,043,752 A | 3/2000 | Hisada et al. | |
| 6,157,953 A | 12/2000 | Chang et al. | |
| 6,386,447 B1 * | 5/2002 | Proefke et al. | 235/380 |
| 6,396,390 B1 | 5/2002 | Achhammer et al. | |
| 6,411,887 B1 * | 6/2002 | Martens et al. | 701/115 |
| 6,577,934 B2 * | 6/2003 | Matsunaga et al. | 701/29 |
| 6,597,284 B2 | 7/2003 | Juzswik | |
| 6,617,961 B1 | 9/2003 | Janssen et al. | |
| 6,650,236 B2 | 11/2003 | Ghabra et al. | |
| 6,771,167 B1 | 8/2004 | Flick | |
| 6,823,464 B2 | 11/2004 | Cromer et al. | |
| 6,839,843 B1 | 1/2005 | Bacha et al. | |
| 6,873,824 B2 * | 3/2005 | Flick | 455/41.2 |
| 6,952,155 B2 * | 10/2005 | Himmelstein | 340/5.52 |
| 6,970,703 B2 * | 11/2005 | Fuchs et al. | 455/426.1 |
| 7,228,420 B2 * | 6/2007 | Dabbish et al. | 713/170 |
| 7,266,435 B2 * | 9/2007 | Wang et al. | 701/36 |
| 7,561,695 B2 * | 7/2009 | Koike | 380/277 |
| 2002/0070845 A1 | 6/2002 | Reisinger et al. | |
| 2003/0117260 A1 | 6/2003 | Fanshawe | |
| 2003/0231550 A1 * | 12/2003 | Macfarlane | 367/198 |
| 2004/0003190 A1 | 1/2004 | Childs et al. | |
| 2004/0003228 A1 | 1/2004 | Fehr et al. | |
| 2004/0119580 A1 * | 6/2004 | Spielman et al. | 340/5.52 |
| 2004/0143583 A1 | 7/2004 | Poole et al. | |

FOREIGN PATENT DOCUMENTS

| | | | |
|---|---|---|---|
| WO | WO 03/105094 A1 | 1/2004 | |

OTHER PUBLICATIONS

U.S. Appl. No. 10/538,537, filed Dec. 20, 2002, Raisch.

U.S. Appl. No. 09/213,324, filed Dec. 16, 1998, Dietz.

* cited by examiner

METHODS AND APPARATUSES FOR REMOTE CONTROL OF VEHICLE DEVICES AND VEHICLE LOCK-OUT NOTIFICATION

FIELD

The present invention generally relates to the field of vehicular control equipment. More particularly, the present invention relates to methods, apparatuses, and media to provide secure communication links between vehicles and wireless communication devices, which may be used to manipulate devices of the vehicles.

BACKGROUND

In the United States of America over 240 million cars and light trucks travel the roads and highways. If one includes Canada, the number of cars and light trucks increases to 259 million. Almost all these vehicles have equipment to protect against theft of the vehicle or theft of property in the vehicle. Most vehicles at least have mechanical locks for doors and trunks that allow a person to unlock them using a simple mechanical key. Some vehicles have electronic locking systems that allow persons to enter security codes using keypads on the externals of the vehicles, such as on the doors, in order to gain access. In addition to these mechanical locks and electronic keypad-based systems, a significant number of vehicles also have remote control access devices that allow users to press a button and activate the mechanical locks of the doors and trunks, as well as other items of the vehicle, such as horns and dome lights. These remote control devices are alternatively referred to as remote keyless entry (RKE) systems.

A standard remote-control lock system, or RKE system, for a motor vehicle generally has a transmitter, normally carried by the owner of the vehicle, a receiver mounted in the vehicle, and some type of a control circuit coupled to the receiver which activates mechanical locks for the doors and trunks. The transmitter usually has a code word generator that produces a changing code word created from a number of binary code bits, a modulator that applies the code word to a signal, and an output unit that takes the modulated signal and transmits it to the receiver. The receiver generally has a front-end signal sensing circuit that picks up the transmitter modulated signal, a demodulator that extracts any code word from the signal, and a processing unit that compares the extracted code word with a stored code word and actuates the mechanical locks or other devices when the received and stored code words match.

The signal transmitted between the transmitter and receiver is usually a radio frequency (RF) signal, such as an ultra-high frequency signal. However, other types of signals are used, such as infrared light signals or even ultrasonic sound signals. In the RF and infrared signal systems, various signal modulation and conditioning techniques are employed, such as amplitude modulation, frequency modulation, pulse width or pulse duration modulation, and phase shift keying. The vast majority of RKE systems employ unidirectional communication. In other words, the transmitter held by the vehicle owner only sends information to the receiver in the vehicle that only receives information. Even so, some systems do employ bidirectional communication methods, such that the remote device and the control device in the vehicle both transmit and receive information.

In order to prevent a thief from intercepting the signal transmitted from the transmitter to the receiver, with such a device as a scanner, and later reproducing the signal to gain access to the vehicle, various methods of protection have been employed. Some systems provide a table of codes that the transmitter and receiver cycle through, such that single individual codes are used infrequently and may not be used successively to gain access. These systems generally include encrypted code bits that keep the transmitter and receiver in synchronization. Alternatively, in other systems, the transmitter and receiver step through the code tables based on a reference to the current time.

Some systems employ an authentication routine to protect against unauthorized access. For example, a system employing one type of an authentication routine may generate changing code from the transmitter in such a manner that only a specially configured receiver can intelligently decode the transmitted signal and act upon it. This unidirectional coding and decoding technique, known as the fixed code method, uses a secret of base number and an algorithm stored in both the transmitter and the vehicle receiver. By means of the algorithm, successive items of code information can be derived from the base number, allowing the vehicle receiver to authenticate the transmitter.

Although keyless entry systems have been well developed and considered useful for supplementing, or even sometimes eliminating the need for, mechanical keys, the existing systems in use today all have drawbacks. One major problem, which affects millions of users every year, is the problem of locking keys inside the vehicle. Almost all of the devices in use today, from mechanical keys to remote keyless devices, are rendered useless once locked inside the confines of the vehicle. Keypad access systems attached to the vehicle provide a remedy for this problem, but keypad systems have also had numerous drawbacks. First, users often forget the security codes. Second, many users do not even take the time to program the codes into the systems in the first place. Another major problem with the remote access control systems in use today is the lack of configurability. In other words, the systems are generally proprietary and require that an owner return to the vehicle dealership or other equipment manufacturer to obtain a specially designed replacement access device, which often employs proprietary hardware. More often than not, owners must pay hefty prices in order to purchase remote access devices that will operate the locks on their vehicles. Obviously, a vehicle owner who has locked the vehicle keys in the car may resort to calling a locksmith, but doing so will cost the owner for every incident. Additionally, owners are often in a hurry and generally do not have time to wait on a locksmith.

One solution available to vehicle owners who lock their keys inside their car is the solution afforded from satellite vehicular access systems. Vehicle owners who choose to pay a monthly subscription fee to a service provider may regain access to their vehicle by calling the service provider. After a short authentication process, the service provider may unlock the vehicle by transmitting an unlock command from a satellite system to the vehicle. Many times, this particular process may be initiated via a cellular telephone belonging to the vehicle owner. Today, such telephones and other wireless devices generally do not interact, or communicate, directly with vehicles in any significant way.

Given the methods and systems available for remotely controlling vehicular devices, such as those which grant access to vehicles, and the associated drawbacks with each of them, vehicle owners need alternative methods and systems that enable them to securely communicate with, and gain access to, their vehicles using alternative wireless devices that are readily available. Such methods and systems for remotely controlling vehicular devices should be configurable by the owners and allow greater freedom with a wide selection of access devices, without requiring special hardware cards, monthly subscription fess, or human intervention.

SUMMARY

The problems identified above are in large part addressed by methods, apparatuses, and media for remote control of vehicle devices and vehicle lockout notification. One embodiment comprises a method that waits for an access attempt by a preconfigured device using wireless communication. The method generally involves communicating with the remote access device using a vehicle controller, encrypting an access code and sending it to the remote device, decrypting the access code in the remote device, and sending the access code back to the vehicle controller to unlock the vehicle. Another embodiment includes determining that an unlocking device has been locked in the vehicle, while another embodiment notifies the user of the remote access device.

Another embodiment comprises a system for granting vehicle access to a user of a remote access device. The system generally uses a vehicle controller to manipulate a vehicle device, such as a door lock, where the user communicates with the central locking unit using a remote access device with wireless communication capability. One embodiment has sensors to monitor when the user has left a key in the vehicle. Another embodiment includes a key embedded with a transmitter to assist the central lockout unit in determining when the key has been locked in the vehicle. One embodiment has a display to allow the user to configure one or more parameters in the central locking unit, while another embodiment includes a keypad for accomplishing the same.

A further embodiment comprises a machine-accessible medium containing instructions for a machine to perform operations allowing a remote access device to manipulate a vehicle device. Generally, the instructions involve establishing a communication link between the controller and the remote access device, transferring encrypted information between the remote access device and a vehicle controller, and manipulating the vehicle device based upon the encrypted information. Alternatively, the instructions may cause the vehicle controller to determine that a user has lock a key inside the vehicle and notify the user that the keys are locked in the vehicle.

BRIEF DESCRIPTION OF THE DRAWINGS

Other objects and advantages of the invention will become apparent upon reading the following detailed description and upon reference to the accompanying drawings in which, like references may indicate similar elements.

DETAILED DESCRIPTION OF EMBODIMENTS

Figure 1:
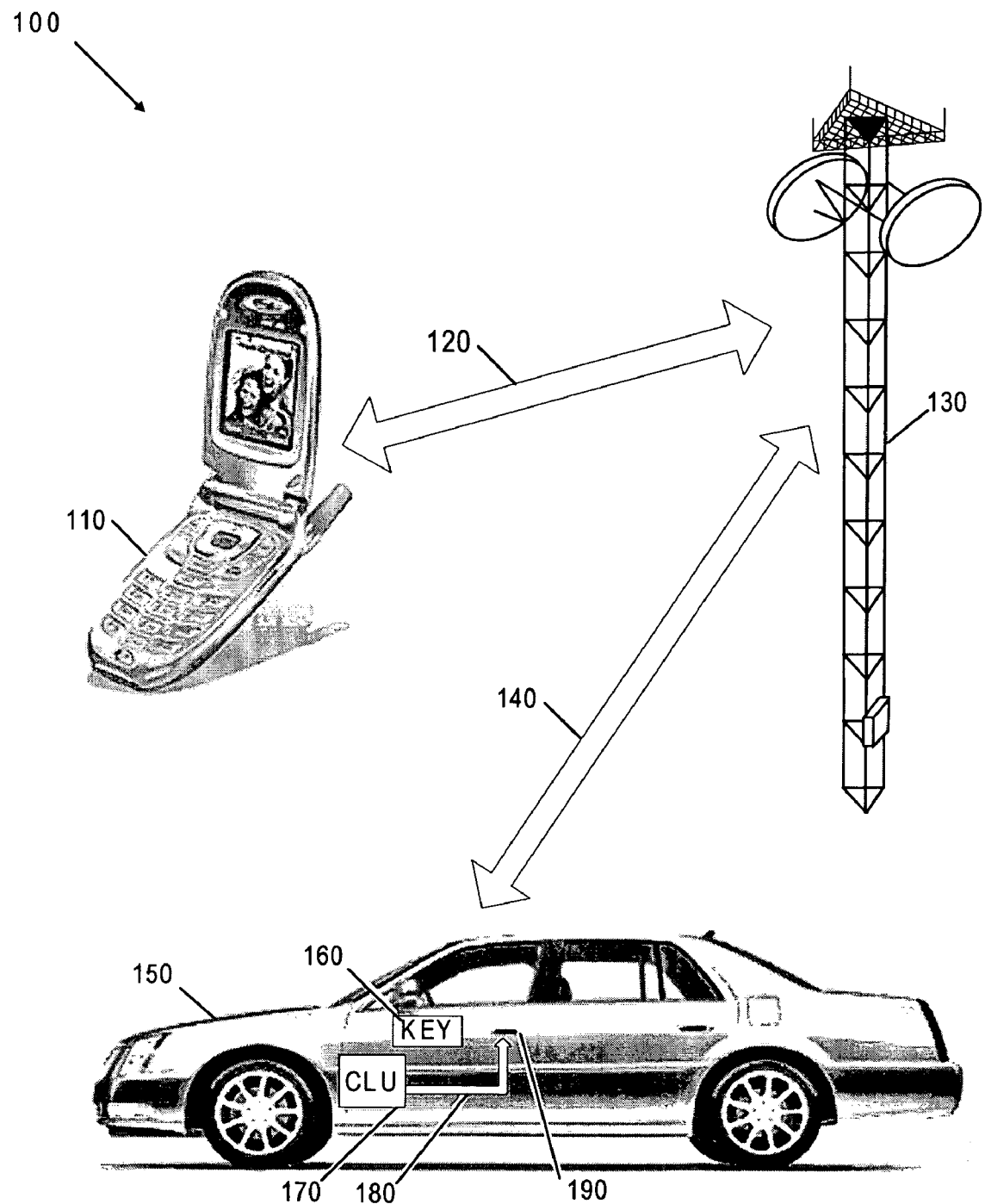
FIG. 1 shows a system diagram employing a cellular telephone for remote keyless access to a car.

The following is a detailed description of example embodiments of the invention depicted in the accompanying drawings. The example embodiments are in such detail as to clearly communicate the invention. However, the amount of detail offered is not intended to limit the anticipated variation of embodiments; but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media for remote control of vehicle devices, such as devices used to grant access to the vehicles, and vehicle lockout notification are disclosed. New techniques for notifying an owner, or user, of a vehicle that keys for the vehicle have been locked inside and ways in which the vehicle may be unlocked with a remote access device are discussed. Embodiments comprise a method of unlocking the vehicle using a secure communication link between the remote access device and the vehicle. In these embodiments, remote access device apparatus software and/or hardware may securely communicate with other apparatus software and/or hardware in the vehicle, authenticate a user of the remote access device, and provide ways for the user to unlock the vehicle. In some embodiments, the apparatus of the vehicle may monitor the confines of the passenger compartment for the presence of the vehicle key. If the key is present, at the same time the doors are locked with the motor off, the apparatus of the vehicle may notify the user of a lockout condition. In other embodiments, the apparatus of the vehicle may monitor the passenger compartment for the presence of the key, but not notify the user and only wait for the user to initiate an unlocking sequence. In further embodiments, the apparatus of the vehicle may not even monitor the compartment for the key, but simply wait for the user to initiate an unlocking sequence using the remote access device.

The methods of notifying the user and accessing the vehicle vary in different embodiments. In some embodiments, the vehicle apparatus will notify the user with one remote device, yet permit another remote device to unlock the vehicle. In other embodiments, the vehicle will notify one remote access device and allow only that device to unlock the vehicle. In even further embodiments, the vehicle device may allow access attempts and prevent unauthorized accesses to the vehicle up to a certain number unsuccessful access attempts, whereupon the device may then cease permitting remote access attempts and only allow a physical mechanical key, or some other local access device, to unlock the vehicle.

While portions of the following detailed discussion describe many embodiments comprising new techniques for remote keyless access and vehicle lock-out notification, a person of ordinary skill in the art will recognize that the following invention may be used to control a variety of different vehicular devices. For example, one embodiment may allow a user to adjust settings of the vehicle using a remote control device, such as seat positions, mirror positions, and radio station presets. Other embodiments may allow the user start the vehicle engine with the remote access device or even stop the engine, which may be desired if the vehicle is ever stolen. All methods of practicing the invention are interchangeable. Further, while embodiments discuss accessing the vehicle using a mobile or cellular telephone, one of ordinary skill in the art will recognize that the vehicle apparatus may communicate with an almost endless variation of wireless access devices, including personal digital assistants (PDAs) and laptop computers that have wireless communication capabilities, for alternative embodiments when employed in accordance with similar constraints to perform substantially equivalent functions.

Turning now to the figures, FIG. 1 shows a system 100 wherein a remote device can be used to unlock a vehicle. More particularly, FIG. 1 shows a cellular telephone 110, which may be used to unlock a car 150. Cellular telephone 110 may communicate with a communications tower 130 via a wireless communications link 120. In turn, communications tower 130 may communicate with car 150 using wireless communications link 140. That is to say, cellular telephone 110 may be used to unlock car 150 using a communications or telephone network, represented in FIG. 1 by wireless communication links 120 and 140, and communications tower 130.

Car 150 has a central locking unit (CLU) 170 which may manipulate a mechanical lock 190 via an electromechanical link 180. Also, as depicted in FIG. 1, car 150 has a key 160. Key 160 may have been left in the ignition by the owner of car 150. CLU 170 may sense that key 160 has been left in the ignition and initiate a notification process whereby CLU 170 sends a message to the owner via wireless communications link 140, communications tower 130, and wireless communications link 120. The notification may be in the form of a text message, a voice-mail message, or some other similar form to cellular telephone 110. In response to the notification, the owner may use cellular telephone 110 to make a return call to CLU 170. After an authentication process, the CLU 170 may create an access code and an asymmetric key pair. CLU 170 may store the access code, encrypt the access code using a public key portion of the asymmetric key pair. CLU 170 may transmit the asymmetric key pair to cellular telephone 110 using a secure communication protocol. The CLU 170 may then transmit the encrypted access code over either a secured or unsecured communications link. Cellular telephone 110 may receive the encrypted access code, decrypt it, and display the decrypted access code to the owner. The owner may reenter the access code into cellular telephone 110 and transmit it to CLU 170. After receiving this access code transmitted from cellular telephone 110, CLU 170 may compare this access code with its stored access code to see if the two match. If the two do match, CLU 170 may then manipulate mechanical lock 190 via the electromechanical link 180 to unlock the car 150 and grant access to the owner.

While the vehicle in FIG. 1 is a car, in alternative embodiments the vehicle may be a truck, a sport-utility vehicle, a semi-truck, or some other automobile. Additionally, in alternative embodiments, CLU 170 may manipulate any one or more doors of the vehicle, including the trunk, instead of just the driver door. As stated, the embodiment depicted in FIG. 1 may sense key 160. In various embodiments, key 160 may be a simple mechanical key, a mechanical key fitted with a sensing and transmitting apparatus, or even another type of remote keyless access device for car 150.

The mobile device in FIG. 1 is cellular telephone 110. However, in other embodiments the mobile device may be a personal digital assistant (PDA), a laptop computer, or some other mobile device. Additionally, while cellular telephone 110 may both receive the that key 160 has been locked inside car 150 and also be used to send the access code back to CLU 170, in some environments one mobile device may receive the notification while a second device may be used to the send the access code to unlock car 150. For example, CLU 170 may notify the owner that key 160 has been left in car 150 by sending a text notification to a pager of the owner. The owner may then call CLU 170 using a mobile satellite telephone to unlock car 150.

One will note, in the description for the embodiment of FIG. 1, CLU 170 in car 150 was termed a central locking unit having the ability to unlock car 150. In alternative embodiments CLU 170 may be vehicle controller and perform other functions, such as starting and stopping the engine of car 150. Also, while the embodiment of FIG. 1 used an asymmetrical key pair to encrypt information, or data, sent between CLU 170 and cellular telephone 110, other embodiments may employ a symmetrical key method to encrypt the information. Additionally, while the embodiment of FIG. 1 discusses transferring key information between CLU 170 and cellular telephone 110, other embodiments may have key information already stored in CLU 170 and cellular telephone 110, such that transferring the key information is not necessary.

Figure 2:
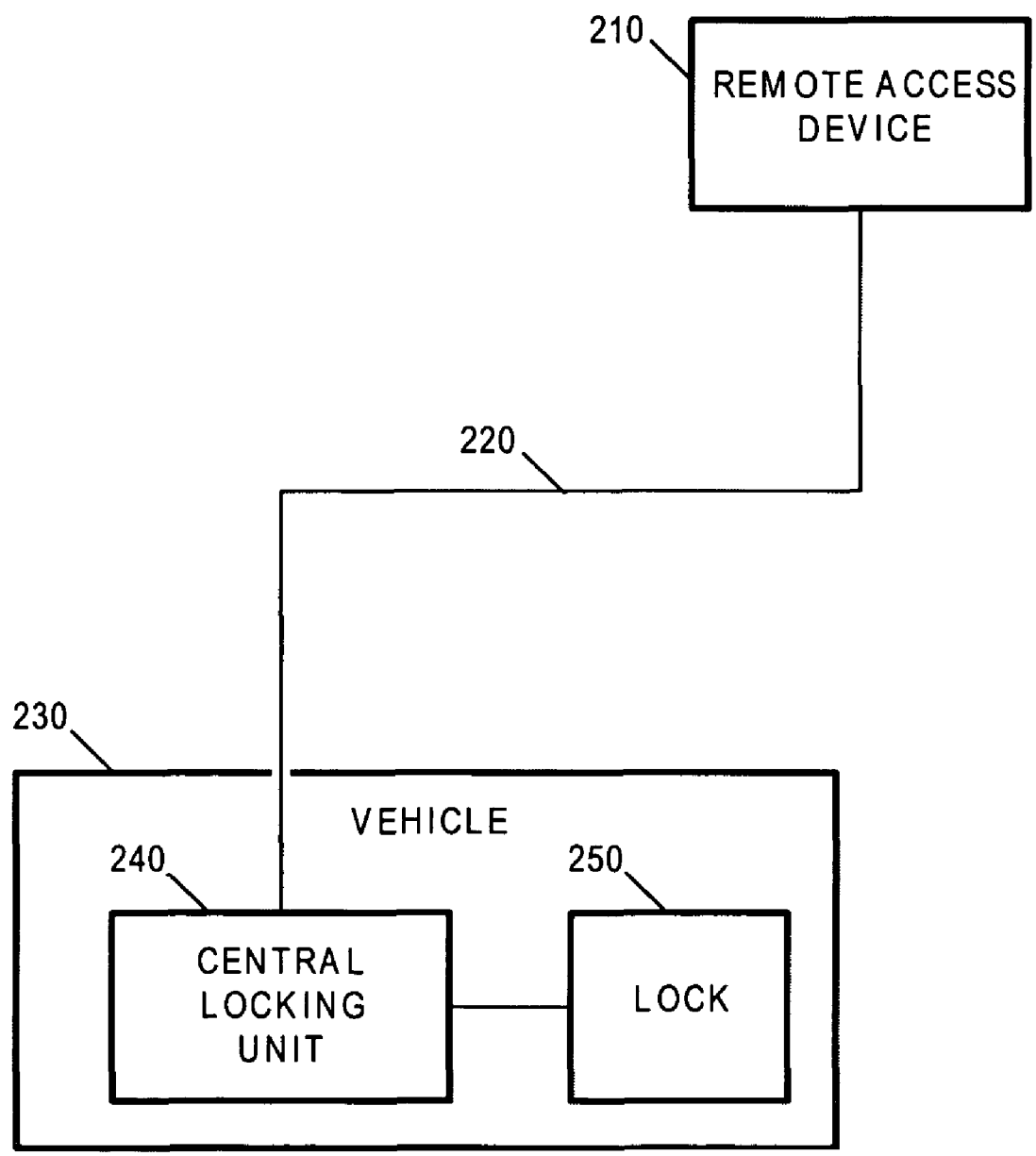
FIG. 2 depicts a system drawing with a remote access device and central locking unit activating a vehicle lock.

To illustrate how one may access a vehicle using a remote access device in various embodiments, we turn to FIG. 2. FIG. 2 depicts a vehicle 230 having a lock 250 and a central locking unit 240. As shown in FIG. 2, vehicle 230 may have lock 250 to secure a door. As mentioned, in some embodiments lock 250 may secure the driver-side door, or it may secure any of the other passenger doors or even a trunk.

Vehicle 230 may have a controller, or central locking unit 240, coupled to lock 250. Central locking unit 240 may, under the proper set of conditions, trigger or manipulate lock 250 and thereby open the door to which lock 250 is coupled. While not shown in FIG. 2, central locking unit 240 may manipulate lock 250 in a variety of ways. For example, central locking unit 240 may energize and de-energize an electromechanical coil and plunger apparatus that in turn deactivate or activate lock 250. Alternatively, lock 250 may be a self-contained electronic lock apparatus, such that central locking unit 240 may manipulate lock 250 by merely applying discrete voltage potentials, such as 0 and 12 volts, or logic-level signals of 0 and 5 volts or 0 and 3.3 volts.

Also depicted in FIG. 2 is a remote access device 210. Remote access device 210 may be coupled to central locking unit 240 by way of a wireless communication link 220. Wireless communication link may couple central locking unit 240 and remote access device 210 directly or indirectly. For example, in some embodiments, wireless communication link 220 may comprise no additional hardware, other than remote access device 210 and central locking unit 240. That is to say, remote access device 210 and central locking unit 240 may communicate directly with each other, such that the signals transmitted by remote access device 210 are received directly by central locking unit 240, and vice versa. In other embodiments, however, wireless communication link 220 may comprise additional communication network hardware, such as cellular telephone communication towers, mobile telephone communication satellites, and other communication hardware, such as satellite dishes, communication network servers, local area networks, wide area networks, and other communication networking equipment similar to equipment that may be found in many mobile telephone switching stations. While it may already be obvious to those skilled in the art, wireless communication link 220 may comprise numerous network elements that are not wireless. For example, much of the communication hardware in wireless communication link 220 may be land-based communication network devices interconnected with wires, networking cables, and other interconnecting hardware, such as fiber optic hardware.

In addition to the types of hardware and other devices that may be included in wireless communication link 220, the form, or mode, of the information transmission between remote access device 210 and central locking unit 240 may vary in different embodiments. For example, in some embodiments remote access device 210 may communicate with central locking unit 240 using an analog signal that is amplitude modulated using a 1000 kilohertz (kHz) carrier. In alternative embodiments, for example, remote access device 210 may communicate with central locking unit 240 by way of a digital signal, using digital modulation in the form of digital bits, using a frequency in the microwave range, such as 850 megahertz (MHz) or 1800 MHz. In other words, wireless communication link 220 may utilize many different signal modulation techniques with many different carrier frequencies, resulting in a numerous signal transmission methods.

Figure 3:
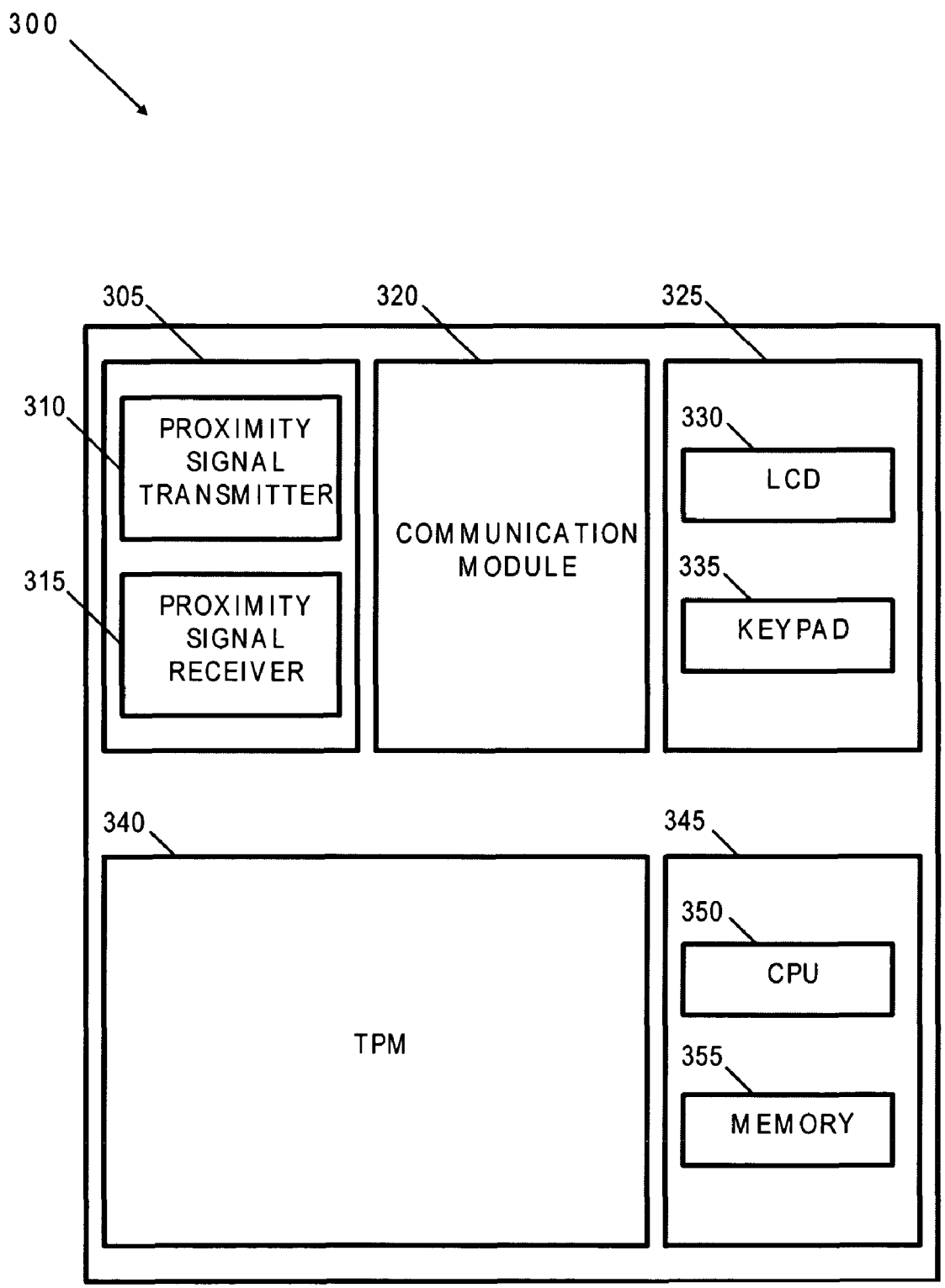
FIG. 3 illustrates a block diagram of a central locking unit, including a trusted platform module, human interface modules, a processor, memory, a sensing module, and a communication module.

Turning now to FIG. 3, we see a block diagram of a central locking unit (CLU) 300 having numerous modules. CLU 300 may monitor the position of keys within a vehicle and determine when a user has locked the keys in the vehicle. Additionally, CLU 300 may also process software logic for notifying and authenticating the user, and activating a mechanical vehicle lock. CLU 300 may reside in a secure location within the vehicle, such as under the vehicle dashboard or in the vehicle console. In other embodiments, however, CLU 300 may reside in other locations of the vehicle, such as under a seat in the passenger compartment, in a trunk, or in under the hood near the firewall. Additionally, CLU 300 may even reside outside the passenger compartment of the vehicle, such as over a fender well or other available vehicle body cavity. Additionally, while the block diagram in FIG. 3 may imply that the components for CLU 300 reside in a single unit, the components, or their equivalents, may physically exist as distinct and separate parts. For example, liquid crystal display (LCD) 330 and keypad 335 may reside on the console of the vehicle, while proximity signal transmitter 310 resides in a steering column of the vehicle. Various embodiments may place the various components at various locations of the vehicle.

CLU 300 may track the vehicle key position with a key-sensing module 305, which comprises a proximity signal transmitter 310 and proximity signal receiver 315. The vehicle key may be manufactured or modified to include a proximity transponder that responds to a query signal transmitted from proximity signal transmitter 310. Once activated under the proper operating conditions, such as when the vehicle motor is off and the doors are locked, CLU 300 may cause proximity signal transmitter 310 to periodically emit the query signal. Upon receiving the query signal from proximity signal transmitter 310, the proximity transponder in the key may respond by transmitting a proximity acknowledgement signal to proximity signal receiver 315, indicating to CLU 300 that the vehicle key may potentially be locked in the vehicle.

In different embodiments, proximity signal transmitter 310 and proximity signal receiver 315 may employ different signaling methods to communicate with the key transponder. For example, in one embodiment the signal may be a digitally encoded infrared signal, while in another embodiment the signal may be a frequency modulated RF signal. In further embodiments, key-sensing module 305 may detect the presence of the vehicle key using conductivity. For example, a tumbler or lock assembly of the vehicle steering column may include voltage potential contacts which only conduct current or pass the voltage potential to key-sensing module 305 when the key is inserted in the ignition. In such an embodiment, proximity signal transmitter 310 may simply comprise a voltage potential coupled to the steering column tumbler, while proximity signal receiver 315 may comprise a voltage detecting input to key-sensing module 305. Additionally, in even further embodiments, CLU 300 may not employ any key-sensing module. Such embodiments may not attempt to detect a vehicle lockout condition in order to notify the owner but merely stand by when the vehicle is not running, waiting for an unlocking request from a remote access device.

In addition to key-sensing module 305, which may communicate with a key transponder, CLU 300 may also contain another module, namely communication module 320, for communicating with external mobile devices that may be used to gain access to the vehicle. In some embodiments, communication module 320 may comprise an onboard wireless networking device. In other embodiments, communication module 320 may contain numerous elements to facilitate communication with a mobile device. For example, communication module 320 may include an antenna, an oscillator to generate a carrier frequency, a signal generator, a mixer to combine an information signal with a carrier frequency, analog-to-digital and digital-to-analog converters, amplifiers, buffers, comparators, and filters. Communication module 320 may serve as the information link between the remote access device and CLU 300 components, such as trusted platform module (TPM) 340 and computing module 345. In other words, communication module 320 may take information from TPM 340 and computing module 345 and transmit it to the remote access device, as well as receive information transmitted from the remote access device and pass it to TPM 340 and computing module 345.

Figure 4:
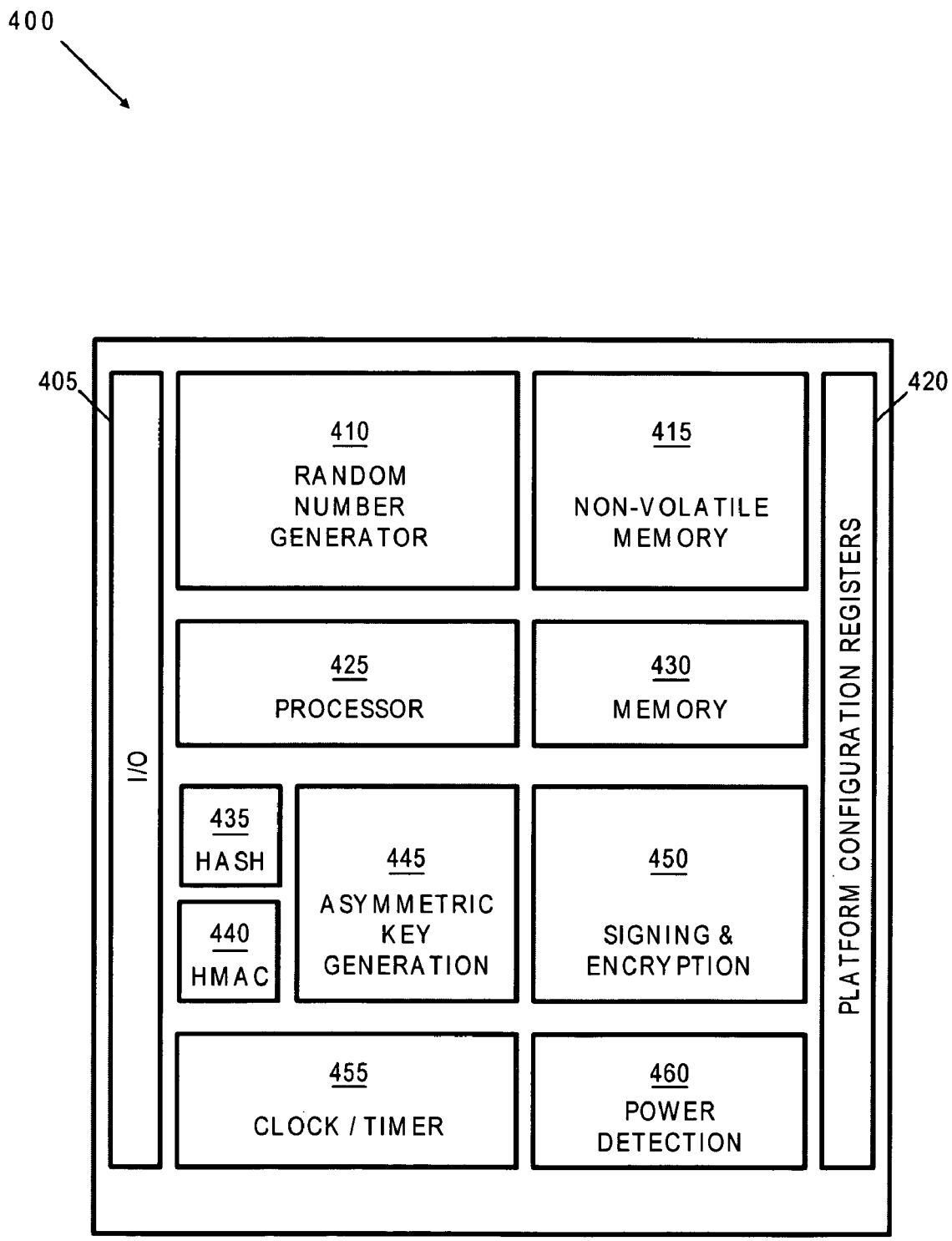
FIG. 4 depicts a block diagram of a trusted platform module.

CLU 300 may contain TPM 340, wherein TPM 340 may be logically bound to the vehicle and used to create a trust infrastructure. In order to create such a trust infrastructure, TPM 340 may be logically bound to the vehicle using such information as the vehicle identification number (VIN) and also logically bound to the remote access device of the user via a sequence of key exchanges. TPM 340 may generate encryption keys and provide protected memory storage for private and sensitive information, such as configuration and communication data. While FIG. 3 may imply that TPM 340 is entirely a hardware device, some embodiments may implement the functions provided TPM 340 using software in a microcomputer, e.g. emulation. In other words, some embodiments may implement the function services provided by TPM 340 in software algorithms that are executed by computing module 345. An example TPM 340 hardware embodiment is shown in FIG. 4 and is discussed in more detail in the discussions for that figure.

As stated previously, CLU 300 may include computing module 345. Computing module 345 may comprise a central processing unit (CPU) 350 and memory 355. Computing module 345 may work in tandem with TPM 340, executing software algorithms and program instructions stored in memory 355 and coordinating the overall operation of CLU 300. For example, computing module 345 may have inputs from the vehicle electrical system, detecting environmental conditions of the vehicle, such as whether or not the vehicle motor is running and whether the doors are locked. Depending on such vehicle environmental conditions, computing module 345 may activate proximity signal transmitter 310 and proximity signal receiver 315 to detect whether the key has been left in the ignition. Upon detecting such a condition, computing module 345 may then work in conjunction with TPM 340 and communication module 320 to notify the user of the vehicle, authenticate the user, and create a secure communication channel between CLU 300 and the remote access device to enable the user to unlock the vehicle. Before computing module 345 may coordinate such activities, though, it may need to be programmed, or configured.

The user may configure various parameters of CLU 300 by using user interface module 325, having LCD 330 for displaying information and keypad 335 for entering information. For example, the user may use keypad 335 and LCD 330 to select the type of mobile device that will be used as the remote access device, as well as cryptographically bind the mobile device to CLU 300 and TPM 340. Additionally, interface module 325 may be used to view and configure numerous other parameters of CLU 300, such as the desired polling period of proximity signal transmitter 310, a cellular telephone or pager number that communication module 320 should notify in case the keys are locked in the vehicle, and the method of user authentication, such as by using a personal identification number (PIN) or using voice authentication. Many configuration parameters may need to be stored in a secure manner, such as by storing them in TPM 340.

While the embodiment depicted in FIG. 3 shows interface module 325 employing LCD 330 and keypad 335 for configuring CLU 300, alternative embodiments may utilize different methods for programming or configuring parameters of CLU 300. For example, instead of LCD 330 and keypad 335, alternative embodiments may utilize a laptop computer for programming CLU 300, connected to CLU 300 using a 9-pin serial cable, or a universal serial cable.

Since a trusted platform module may be used extensively in various embodiments, a detailed trusted platform module that may be utilized in numerous embodiments will now be discussed. FIG. 4 shows what may be a TPM 400 in various embodiments. TPM 400 may be a uniquely designed device, or it may be a commercially available device that may be cryptographically bound to a vehicle and used to protect remote access device configuration information. TPM 400 may be cryptographically bound to a vehicle, during manufacturing, using a unique identification number, such as the vehicle identification number or some other number that is unique to each vehicle. Such binding may be incorporated using read-only memory, such as non-volatile memory 415, so that the binding may not be subsequently altered. Such binding may help ensure that TPM 400 cannot be removed from one vehicle and used in another. TPM 400 may also be cryptographically bound to a mobile device belonging to the vehicle owner using a sequence of key exchanges. Binding the mobile device with TPM 400 may create a cryptographic link and identification between the mobile device and the TPM 400.

TPM 400 may have a random number generator 410 to generate random numbers to be used for generating unique unlocking codes. TPM 400 may store the unique unlocking codes in protected memory 430, which may be designated for holding such information as unlocking codes, asymmetric keys, digital certificates, other cryptographic information, and user notification preferences. TPM 400 may have secure inputs and outputs (I/O) 405 in order to access main input and output devices (such as LCD and keypad interfaces) in a trusted manner. Secure I/O 405 may be required so that the user knows that information being displayed on the LCD comes from TPM 400, and also when TPM 400 requests for input, and so that no other software can interfere with input data.

TPM 400 may have a processor 425 to control its integral operations. For example, processor 425 may cause random number generator 410 to generate a random number to be used as an unlocking code, store the random number in memory 430, whereupon it will be later encrypted and sent to the mobile device. Processor 425 may also be used to receive the access code attempt from the remote access device, store it in memory 430 along with the original random number, and compare the two numbers for equality. Additionally, TPM 400 may have platform configuration registers 420 which may be used to store integrity metrics.

TPM 400 may have numerous components for generating encryption keys end encrypting data. For example, as depicted in FIG. 4, TPM 400 contains a hash module 435 and keyed-hash message authentication code 440 to calculate a message authentication code using a hash function in combination with a secret key. Also as depicted in FIG. 4, TPM 400 contains an asymmetric key generation module 445 and a signing and encryption module 450 to generate encryption keys for secure communications between TPM 400 and the remote access device.

TPM 400 may also contain a clock 455 that may be used for a variety of purposes within the platform. For example, clock 455 may provide the clock signal to processor 425 so that processor 425 may cycle through instructions stored in non-volatile memory 415 and in volatile memory 430. Also TPM 400 may contain power detection circuitry 460 to monitor the voltage from an external power supply and switch to an internal voltage source should the external voltage subside. Additionally, power detection circuitry 460 may also include a power detection latch that may be used as a tamper-detection security function.

Figure 5:
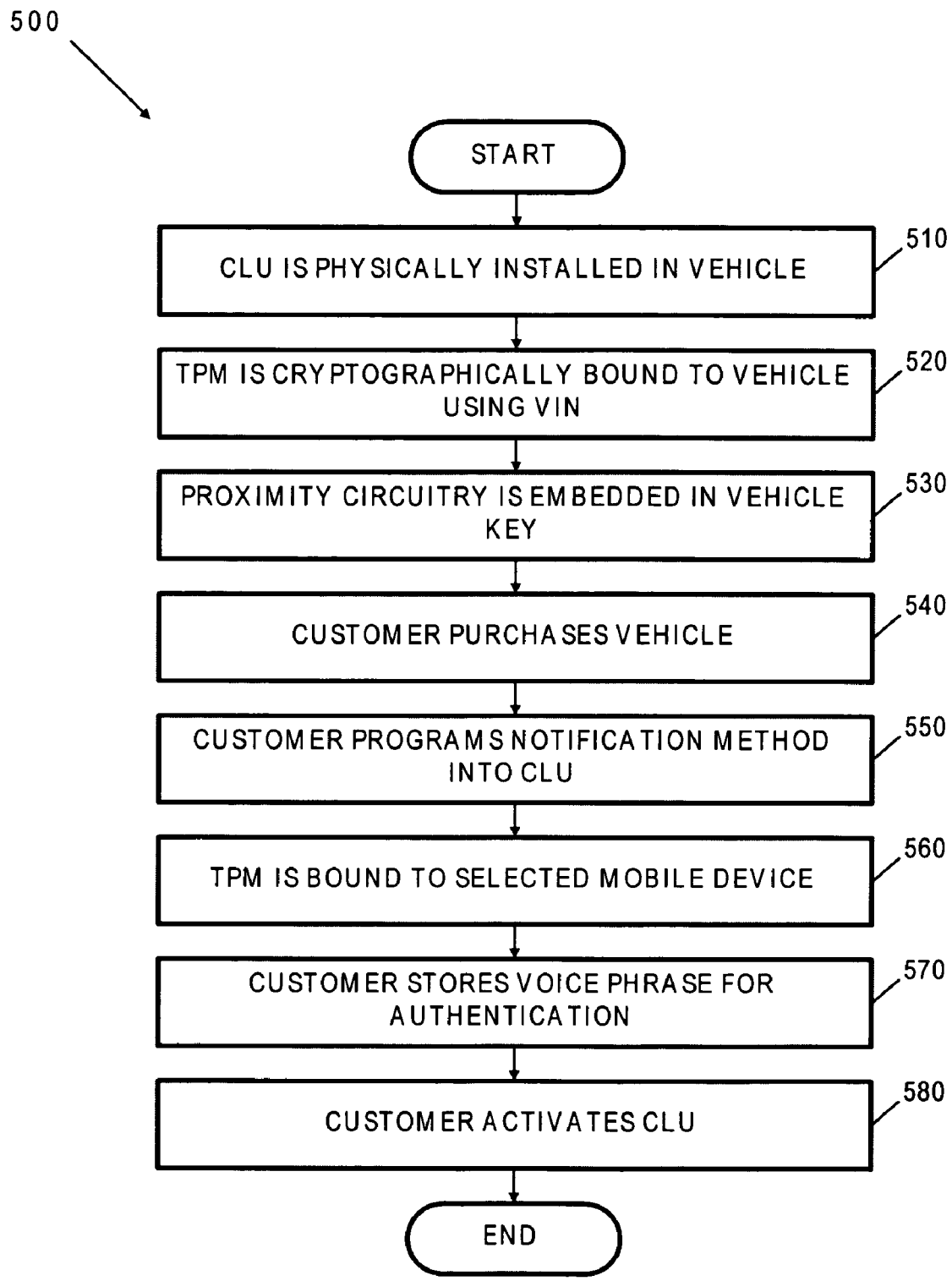
FIG. 5 shows a flowchart illustrating how a central locking unit may be implemented in a vehicle to provide remote keyless access.

FIG. 5 illustrates, in a concise manner, the preparatory steps that may be necessary to implement a central locking unit in a vehicle so that it may be used to unlock the vehicle with a remote access device. As shown in FIG. 5, the process may begin with first installing the CLU in the vehicle (element 510). As mentioned, the CLU may be installed in numerous vehicle locations, such as in the vehicle dashboard or in the trunk. Once the CLU is physically installed, the CLU trusted platform module may be logically, or cryptographically, bound to the vehicle using a unique identification number (element 520). To work in conjunction with the CLU and its key sensing circuitry and algorithms, the vehicle manufacturer may embed communication circuitry, such as an infrared transponder, into the vehicle key (element 530).

Once the CLU is physically and logically installed in the vehicle with a corresponding vehicle key (elements 510 through 530), the manufacturer may distribute the vehicle to a car dealership for purchase by the vehicle owner (element 540). Note, however, that the CLU may still need to be configured before the owner may use it to unlock the vehicle with a mobile device, or remote access device. Specifically, the owner may have to enter the desired notification method into the CLU (element 550). For example, the owner may prefer that the CLU notification method be a text-message to a cellular telephone of the owner. After selecting the notification method and the mobile device to be used as a remote access device, the owner may then bind the mobile device to the TPM (element 560), so that the CLU may communicate with the mobile device in a secure manner. Additionally, the owner may store information in the TPM, such that the information may allow the CLU to uniquely identify the owner once an unlocking sequence is initiated. For example, the owner may store a unique voice authentication phrase in the TPM (element 570). After completing these configurations steps, the owner may then activate the CLU (element 580), in order to have it start monitoring the environment of the vehicle for a lockout condition.

Figure 6A:
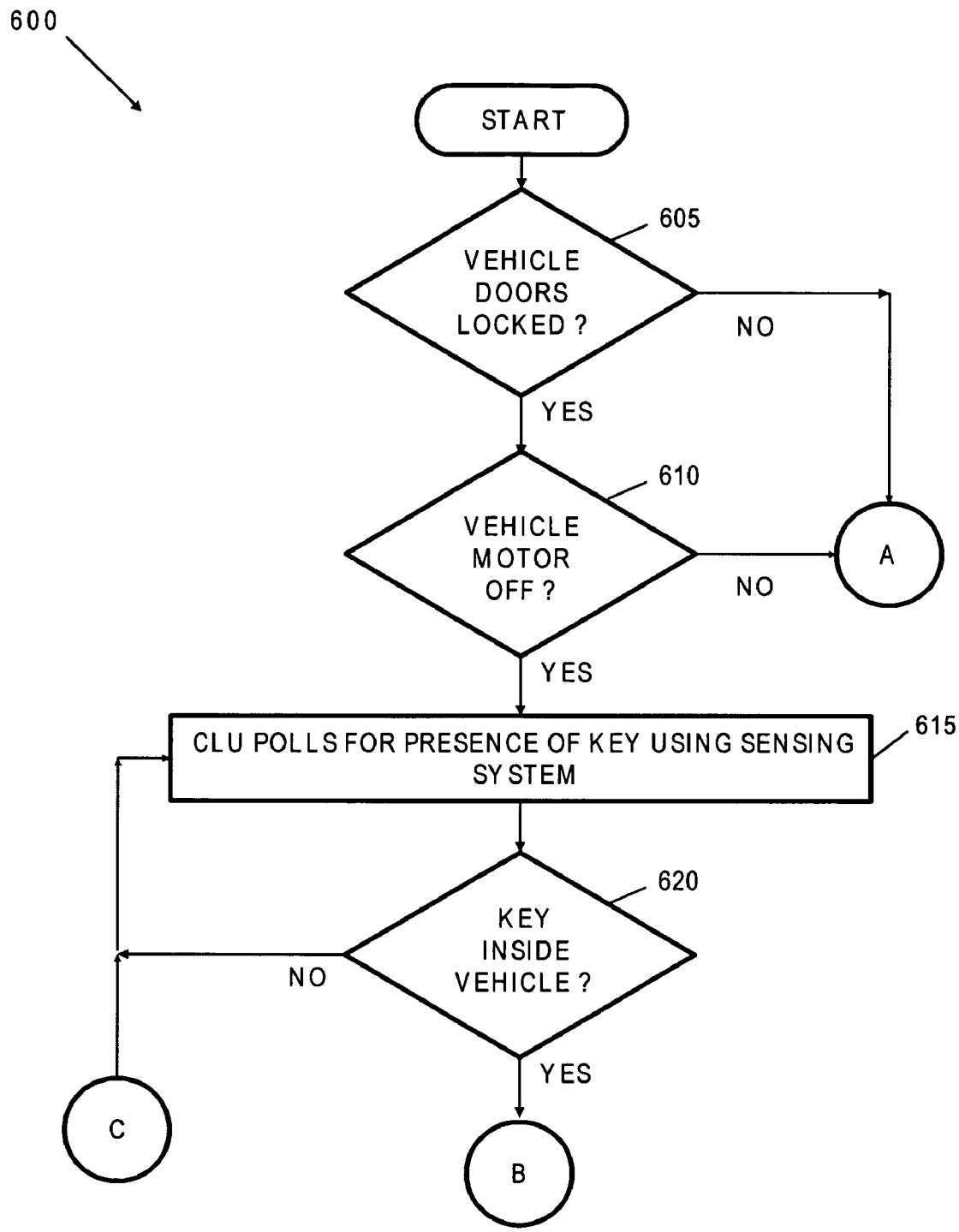
FIGS. 6A-6B depict a flowchart illustrating a key sensing and lock-out detection algorithm.
Figure 6B:
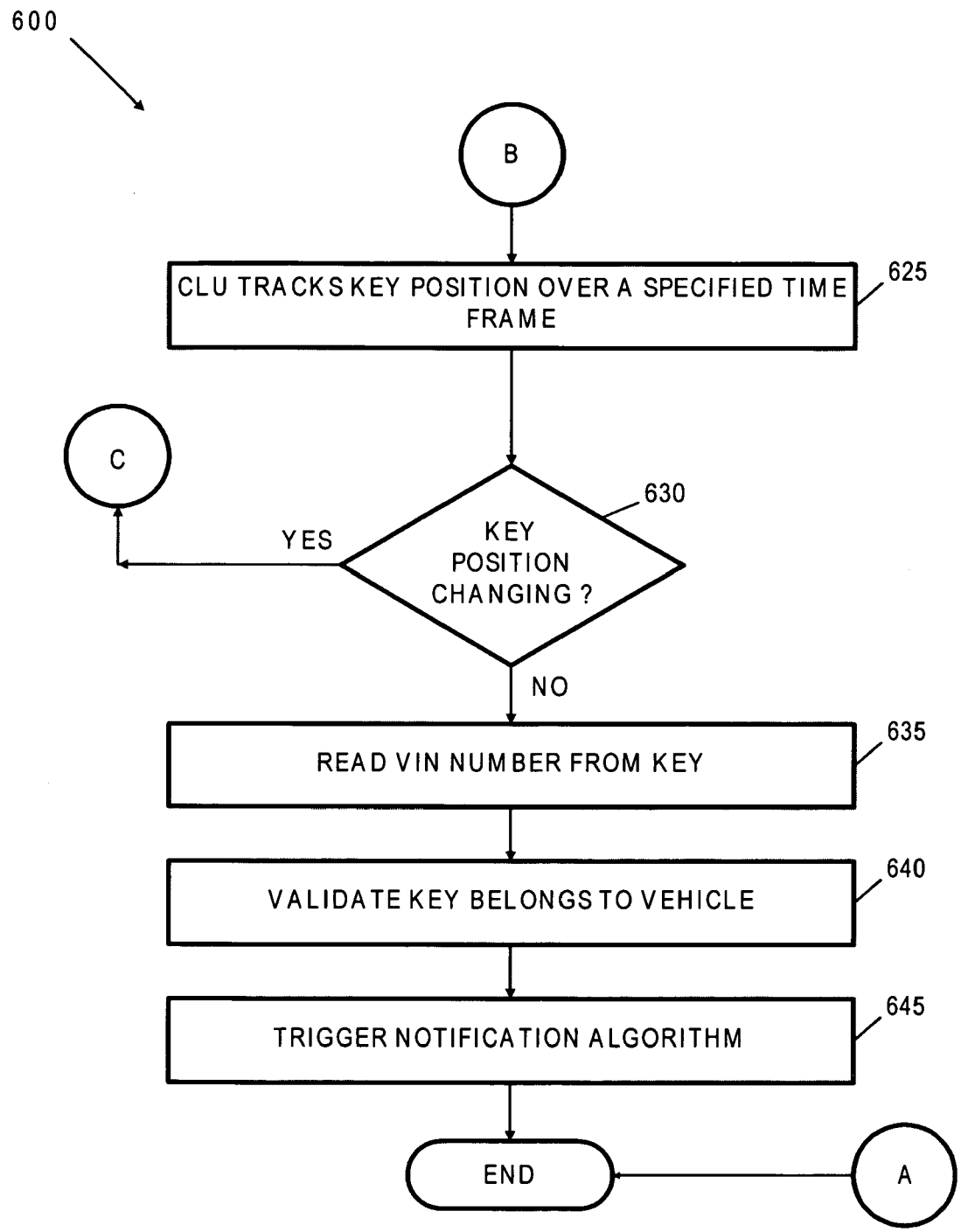
Figure 7A:
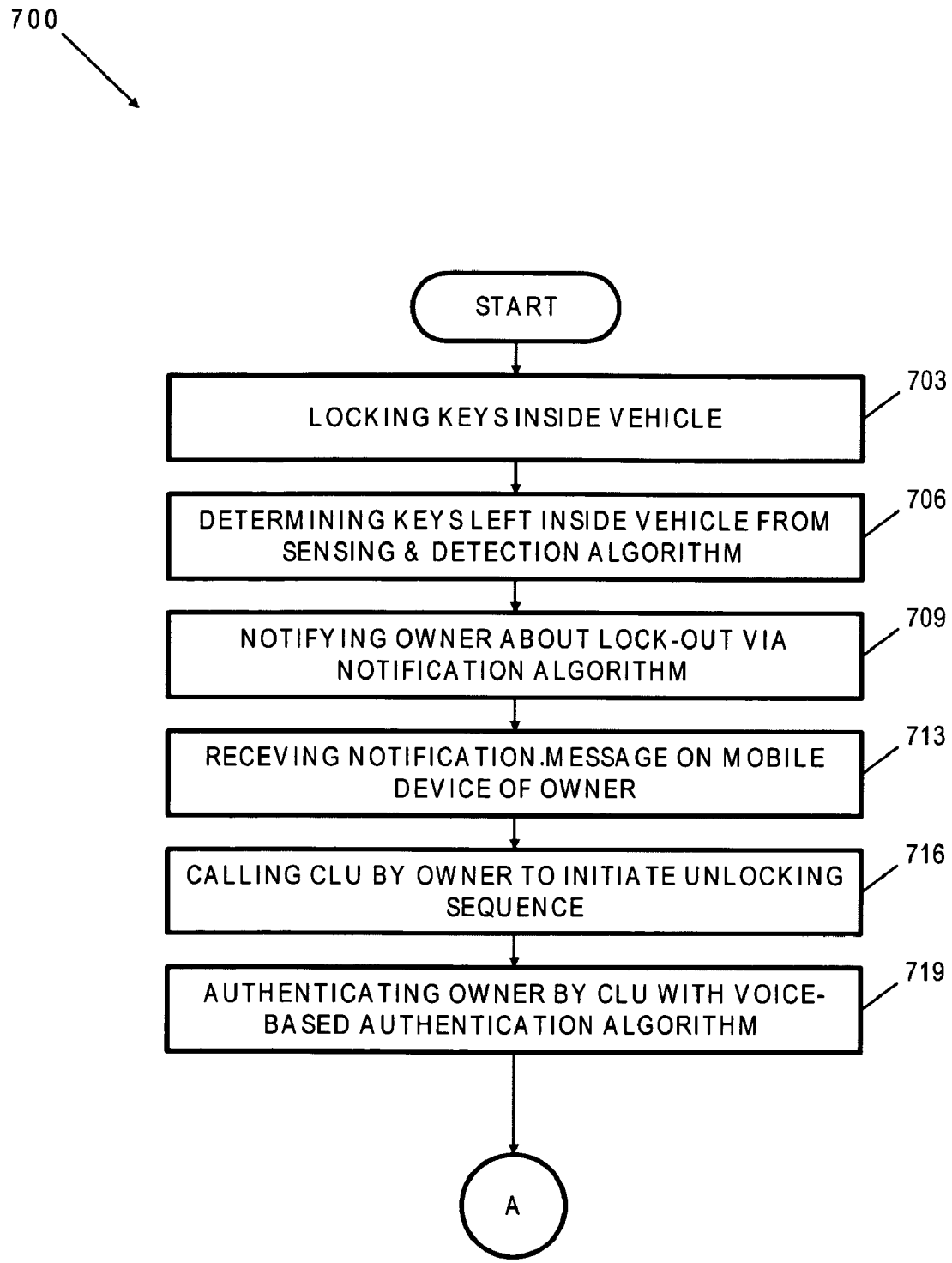
FIGS. 7A-7D depict a flowchart illustrating an algorithm for notifying and authenticating a vehicle owner in order to unlock the vehicle using a mobile device.
Figure 7B:
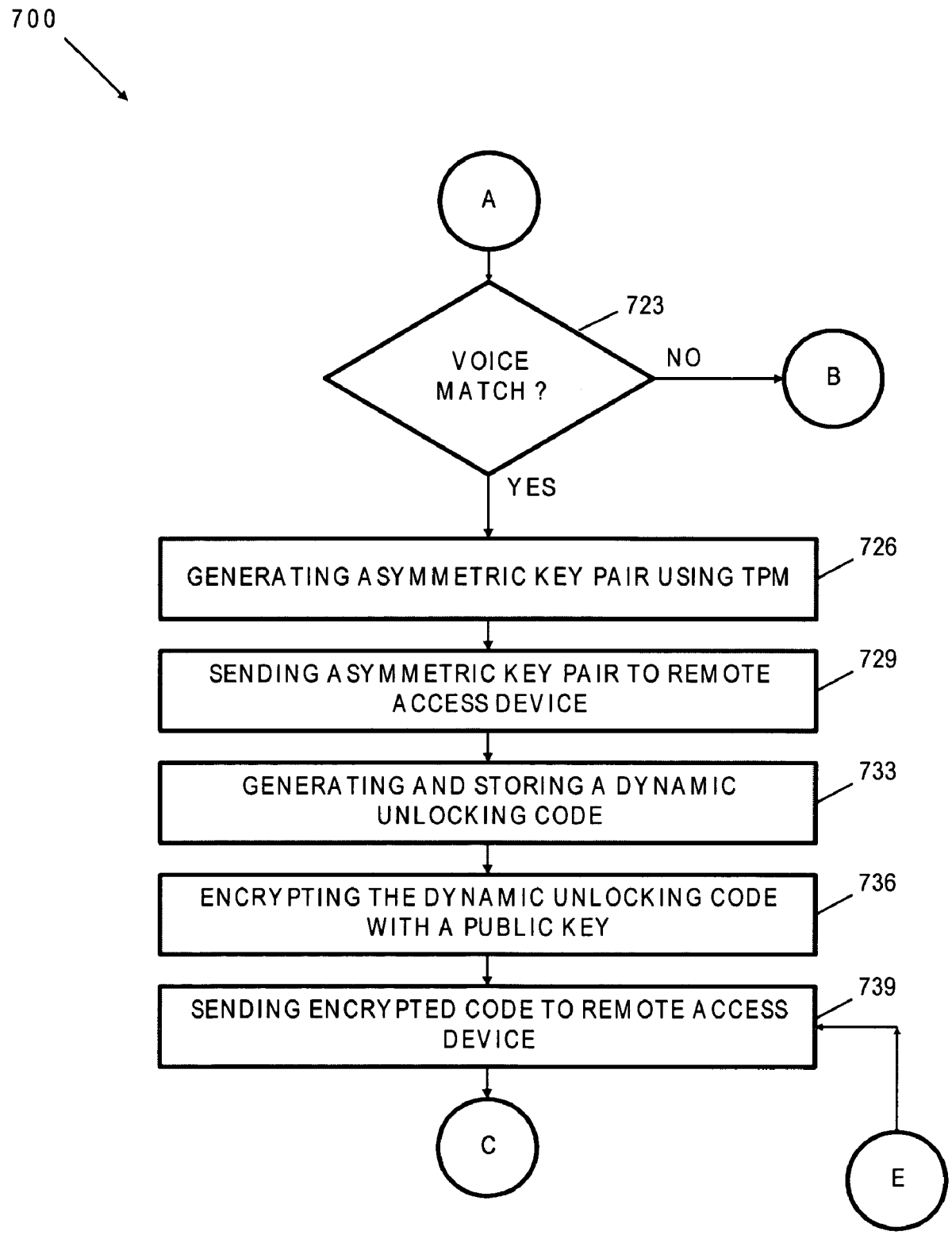
Figure 7C:
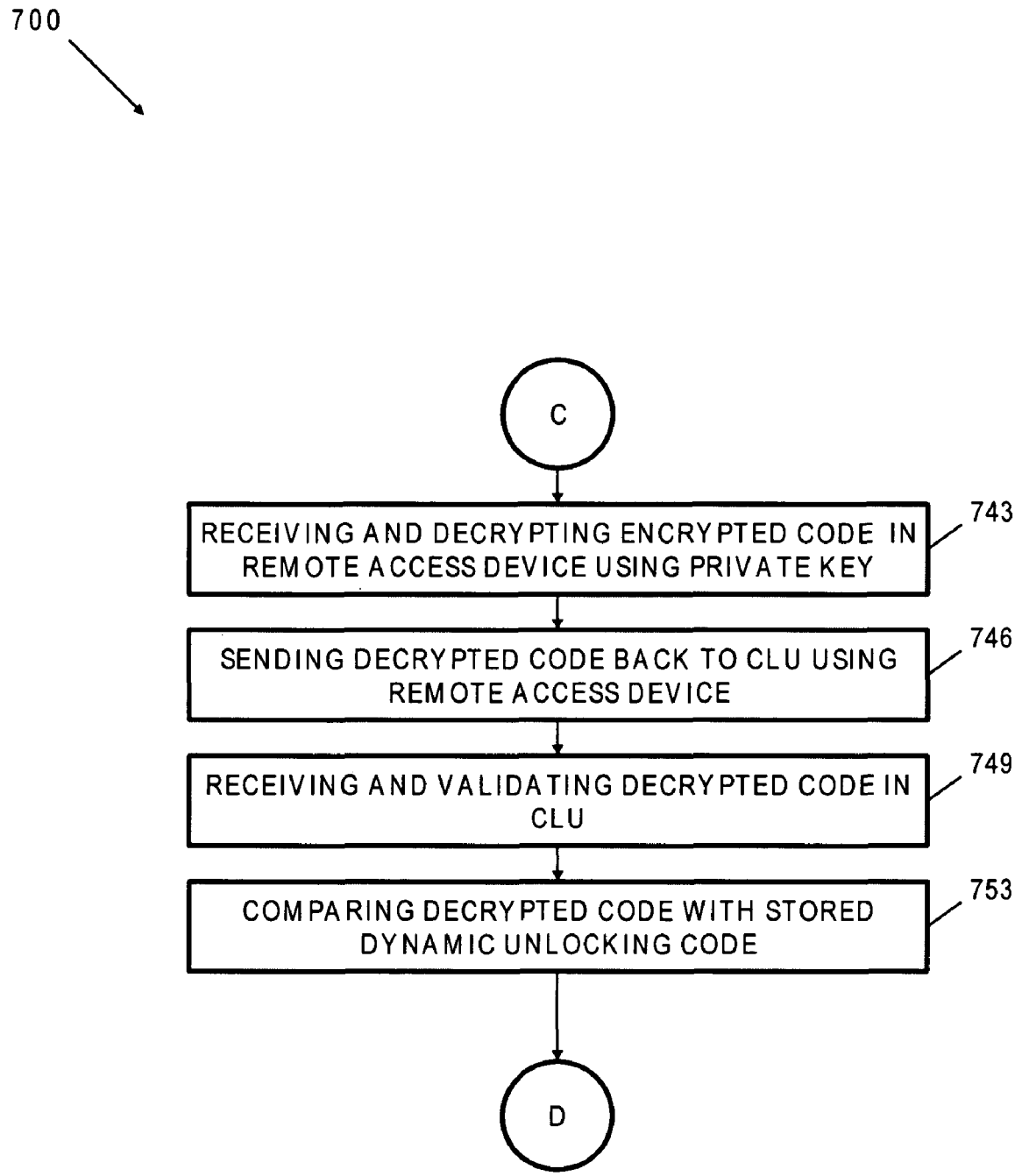
Figure 7D:
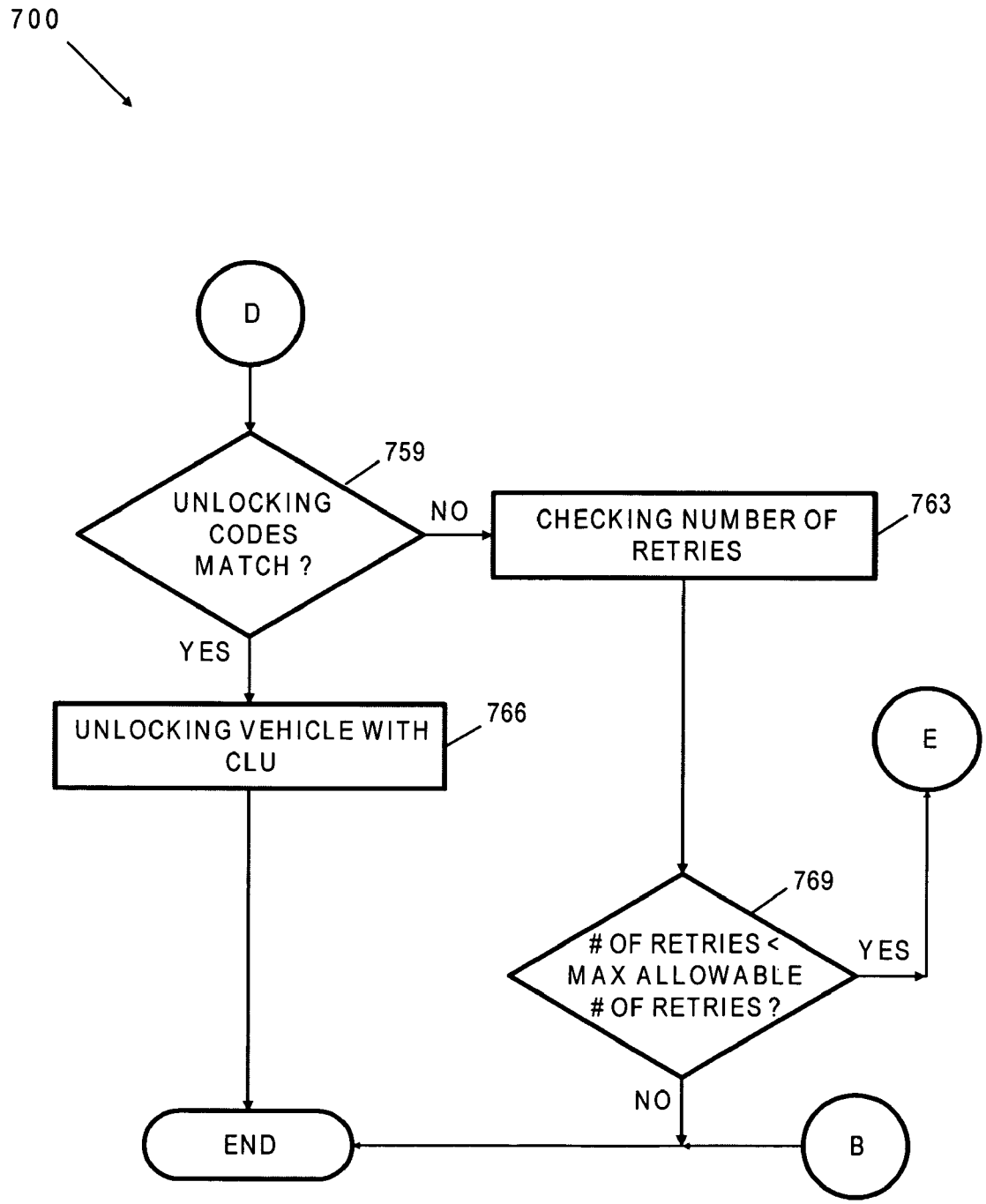

For embodiments that employ key sensing circuitry in order to notify a user that a key has been locked out of a vehicle, FIGS. 6A and 6B depict a flowchart 600 illustrating an example embodiment of a key sensing and detecting algorithm. The algorithm of flowchart 600 may reside in a memory device of the CLU and provide instructions for a CLU processor, such as memory 355 and CPU 350 shown in FIG. 3. Such instructions may allow the CLU processor to detect when the key has been locked inside the vehicle when used in conjunction with key sensors similar to proximity signal transmitter 310 and proximity signal receiver 315, also in FIG. 3.

As shown in FIG. 6A, flowchart 600 may begin with first determining if the doors of the vehicle are locked (element 605) while the vehicle motor is not running (element 610). In the algorithm of flowchart 600, only when the vehicle doors are locked and the motor is off will the CLU start sensing for the presence of the key in the vehicle (element 615). While sensing for the presence of the key, the CLU may continuously poll for the presence of the vehicle key using an onboard proximity transmitter and proximity receiver. The CLU may poll by transmitting a periodic signal to detect the presence of the key. A key that has an embedded transponder may respond to the signal being sent by the CLU proximity transmitter if the key is within transponder range, which might be the case if the key is inside the passenger compartment. As long as the CLU does not detect the presence of the key, it may continue polling for the presence of the key (elements 615 and 620). However, upon receiving a response from the embedded key transponder, the CLU may continue sending signals for several consecutive minutes to track the car key position (element 625).

The CLU sensing algorithm may verify that the position of the key does not change over the specified time frame (element 630). For example, the CLU may verify that the position of the key does not change for a period of five minutes. A change in key position may indicate that a user is holding the keys or that the user is still in the passenger compartment. If the key position changes within the time frame, the CLU may continue going back and polling for the presence of the key (element 615) again. However, upon determining that the key position has not changed within the prescribed time frame, the CLU may continue by reading the vehicle identification number bound to the key transponder (element 635) and ensuring that the key belongs to the vehicle (element 640). If the VIN matches the VIN stored within the TPM, the CLU may initiate a notification algorithm to inform the user that the keys have been locked in the vehicle (element 645).

One may note that in alternative embodiments, elements 635 and 640 may not be needed. For example, the embedded key transponder and the CLU may be configured such that the key transponder only responds to its parent, or original, CLU. In such an embodiment, the CLU may be unable to trigger a response from a foreign key transponder.

To illustrate a method for unlocking a vehicle using a CLU and a mobile device, we turn now to FIGS. 7A, 7B, 7C, and 7D. Beginning with FIG. 7A, we see an example method flowchart 700 beginning with the condition that a person locks their keys inside the vehicle (element 703). Once the keys have been locked in the vehicle, the CLU may start monitoring conditions, or parameters, related to the operation of the vehicle using a sensing and detection algorithm (element 706). For example, the CLU may monitor the status of the motor, whether the doors have been locked, whether the key is in the ignition or in the passenger compartment, whether the key belongs to the vehicle, and whether or not the key position has changed for a predetermined amount of time.

Such monitoring by the CLU may be performed by circuitry sensing voltages or currents at various points in the electrical infrastructure, or electrical system, of the vehicle. In alternative embodiments, the CLU may simply monitor a digital output from an external device, such as a computer system controlling motor operation, fuel addition, or fault monitoring.

Assuming the CLU detects that the keys have been locked in the car, a method according to flowchart 700 may continue by using an onboard wireless networking device, combined with preconfigured information pertaining to the desired notification method, to notify the owner of the lockout condition (element 709). In an example embodiment, once the CLU establishes that a lockout condition has occurred, the CLU may then transmit a text message "You have been locked out of your vehicle." to the mobile device that the owner preconfigured into the CLU. The notification device may have been defined as part of the CLU configuration process. For example, if the owner selected a cellular telephone for the notification device and entered their mobile phone number, then the owner may receive a text message on their cellular phone indicating that the owner locked the keys in the car. Such message broadcast will rely on wireless technology algorithms and hardware to transmit the messages.

A method according to flowchart 700 may continue with the owner receiving the lockout message on the mobile device (element 713). In response, the owner may call the CLU to initiate an unlocking sequence (element 716). To initiate the unlocking sequence, the owner may have to acknowledge receipt of the message. However, before initiating the unlocking sequence, the CLU may first be required to authenticate the caller as the true vehicle owner (element 719). This authentication process may comprise requiring the caller to provide an authentication phrase after connecting with the CLU. As stated previously, the original authentication phrase may have already been stored as part of the CLU configuration. Upon receiving the authorization phrase the CLU may perform several steps. First, the CLU may capture the spoken and transmitted authentication phrase, by converting the analog sound into a digital encoded sound sample file. The CLU may store this sample file in memory contained in the CLU. The CLU may then compare this sample file with the original authentication phrase stored in the TPM during the CLU configuration. If the two sound files do not match (element 723), the CLU may terminate, or sever, the communication link and exit the CLU authentication algorithm. However, if the two sound files do match (element 723), the CLU may then authenticate the owner and proceed to dynamically generate an asymmetric key pair using an asymmetric key pair generation algorithm (element 726) in the TPM.

The TPM may dynamically generate the asymmetric key pair using its onboard hardware and software. The asymmetric key pair may have public and private entities. After generating the key pair, the TPM may store them in protected TPM memory. The TPM may utilize the key pair to encrypt and decrypt messages sent between the CLU and the remote access device. In order to facilitate the encryption and decryption process using the remote access device, the CLU may share the key pair with the remote access device (element 729). In order to share the key pair with the remote access device in a secure fashion, the TPM may establish a secure network connection between itself and the remote access device. For example, the TPM may create a secure socket layer when communicating with the mobile device. After establishing the secure network connection, the TPM may transfer the asymmetric key pair to the remote access device, whereupon the device may store the asymmetric key pair in protected memory of the remote access device. After transferring the asymmetric key pair to the remote access device, the TPM may close the secure network connection between itself and the remote access device. The end result of this key sharing may be that both the TPM and the remote access device have the same dynamically created key pair.

After sending the key pair to the remote access device, the TPM may continue by generating and storing a dynamic unlocking code (element 733). The TPM may generate the unlocking code using a random number generator within the TPM. This unlocking code will be used to challenge the user of the remote access device and potentially unlock the vehicle. Similar to the asymmetric key pair, the TPM may store the unlocking code in protected memory of the TPM.

The TPM may proceed by encrypting the dynamic unlocking code using the shared public key (element 736). Upon encrypting the unlocking code, the TPM may continue by opening a communication connection with the remote access device, waiting for an acknowledgement of creating a successful connection between the TPM and the remote access device, and sending the encrypted unlocking code to the device (element 739). In some embodiments, this connection for sending the encrypted unlocking code may also be a secured connection. However, in other embodiments, this connection may not need to be secured since the information is being sent encrypted.

The remote access device, having decryption capability, may receive the encrypted unlocking code and decrypt it using the shared private key (element 743). The encrypted code may only be properly decrypted with the correct private key pair. The result of the decryption using the correct private key will be the original unlocking code. With the remote device having decrypted the unlocking code, the TPM may initiate a questioning prompt, requesting the user of the remote device to enter the decrypted unlocking code so that the TPM may unlock the vehicle. For example, if the remote access device is a cellular telephone, the TPM may cause the telephone to display "Please enter the unlocking code." In response to the prompt, the user may enter the decryption code using the keypad on the cellular telephone. Once the user enters the decryption code, the cellular-telephone may transmit the code entered by the user back to the CLU (element 746).

The TPM may receive the unlocking code entered by the user and store the received code in TPM protected memory in preparation for validating and comparing the received code with the previously stored unlocking code (elements 749 and 753). For example the validation and comparison routines may ensure that the code received from the remote access device is in the proper format, such as having the correct number of characters that are in the proper sequence, and that the code precisely equals the original unlocking code stored in TPM memory.

If the code received back from the remote access device matches the original unlocking code, the CLU may unlock the vehicle (elements 759 and 766). However, if the two codes do not match, the CLU may allow the user to attempt to enter the correct code a number of different times (elements 759, 763, and 769). For example, the CLU may allow three unsuccessful access attempts for every twenty minute period. In such a case, the CLU may initiate another transmission of the encrypted code to the remote access device (elements 763, 769, and 739) so that the user may reenter the decrypted code. If, after finding the number of unsuccessful access attempts, or retries, exceeds the maximum allowable for the present time period, the algorithm may immediately terminate (elements 763 and 769).

Another embodiment of the invention is implemented as a program product for use with a storage device to protect sensitive information stored in the device, in accordance with, e.g., flowchart 800 as shown in FIG. 8. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within the hard drive); and (ii) alterable information stored on writable storage media (e.g., magnetic media of a hard drive). Such data and/or signal-bearing media, when carrying microprocessor-readable instructions that direct the functions of the present invention, represent embodiments of the present invention.

In general, the routines executed to implement the embodiments of the invention, may be part of a storage device operating system or a specific component, program, module, object, or sequence of instructions contained within memory of the storage device. The microprocessor program of the present invention may be comprised of a multitude of instructions that will be translated by the microprocessor into a machine-readable format and hence executable instructions. Also, the programs may be comprised of variables and data structures that either reside locally to the program or are found in memory or other storage devices. In addition, various programs described hereinafter may be identified based upon the application for which they are implemented in a specific embodiment of the invention. However, it should be appreciated that any particular aforementioned program nomenclature is used merely for convenience, and thus the invention should not be limited to use solely in any specific application identified and/or implied by such nomenclature.

One skilled in the art of computing and data security will readily appreciate the flexibility and opportunities that the various embodiments for protecting sensitive data contained in storage devices afford the field of information storage. These examples are only a few of the potential cases wherein the methods of protecting sensitive information in storage devices, or machines and media that accomplish essentially the same, greatly data storage device security.

It will be apparent to those skilled in the art having the benefit of this disclosure that the present invention contemplates methods, apparatuses, and media to protect sensitive information in information storage devices. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to manipulate a vehicle device of a vehicle via a remote access device, comprising:
    generating, by an asymmetric key generation module of a vehicle controller, an encryption key pair to encrypt data to be transferred to the remote access device, wherein the vehicle controller comprises a microprocessor and a trusted platform module (TPM), wherein further the TPM comprises a hash module, a key-hash message authentication code (HMAC) module, and a random number generator;
    transferring, via a mobile telephone switching station, encrypted data from the vehicle controller to the remote access device;
    decrypting, by the remote access device, the encrypted data via an encryption key of the encryption key pair; and
    manipulating the vehicle device via the vehicle controller based upon receipt of a response transmitted by the remote access device, wherein the response is generated in response to the decrypting the encrypted data.

2. The method of claim 1, further comprising transmitting the encryption key pair to the remote access device.

3. The method of claim 2, further comprising authenticating a user of the remote access device by the vehicle controller, wherein the remote access device comprises a cellular telephone, wherein further the transmitting the encryption key pair is based upon successful authentication of the user.

4. The method of claim 3, wherein authenticating a user of the remote access device by the vehicle controller comprises verifying user identity by comparing the voice of the user with a voice sample stored in the vehicle controller.

5. The method of claim 1, further comprising generating and storing a code by the vehicle controller, encrypting the code using the encryption key pair, wherein the transferring the encrypted data comprises sending the encrypted code to the remote access device.

6. The method of claim 5, further comprising receiving the encrypted code by the remote access device, decrypting the encrypted code via the encryption key to generate the response, and sending the response to the vehicle controller.

7. The method of claim 6, further comprising receiving the response by the vehicle controller and comparing the response with the first code, wherein manipulating the vehicle device based upon the modified data comprises manipulating the vehicle device based upon the comparison.

8. The method of claim 6, further comprising displaying the code by the remote access device and prompting the user to send the code to the vehicle controller.

9. The method of claim 1, further comprising determining that an unlocking device for the vehicle has been locked inside the vehicle.

10. The method of claim 9, further comprising notifying a user of the remote access device that the unlocking device has been locked inside the vehicle.

11. The method of claim 1, wherein the transferring the encrypted data comprises transferring the encrypted data between a cellular telephone and the vehicle controller.

12. An apparatus to control a vehicle device of a vehicle, the apparatus comprising:
    a key generation module configured to generate asymmetric key pairs;
    a wireless transmitting circuit to transmit encrypted data to a remote access device via a mobile telephone switching station;
    a wireless receiving circuit to receive a response from the remote access device, wherein the response is based on decryption of the encrypted data using a key from an asymmetric key pair of the key generation module; and
    a controller to manipulate the vehicle device based upon receipt of the response from the remote access device, wherein the controller comprises a trusted platform module (TPM), wherein further the TPM comprises a hash module, a key-hash message authentication code (HMAC) module, and a random number generator.

13. The apparatus of claim 12, further comprising a sensor coupled to the controller to sense when a key has been locked in the vehicle.

14. The apparatus of claim 13, wherein the key comprises an embedded transmitter to transmit a signal in response to a polling signal transmitted from a polling signal transmitter coupled to the controller.

15. The apparatus of claim 12, further comprising a display apparatus and a keypad to assist a user in configuring one or more of the parameters of the controller.

16. A system, comprising:
    a communication module configured to communicate with a cellular telephone via a mobile telephone switching station;
    a random number generator configured to generate an access code;
    a key generation module configured to generate asymmetric key pairs;
    an encryption module to encrypt the access code via a first key of an asymmetric key pair; and
    a controller to manipulate a vehicle device in response to receiving the access code from the remote access device, wherein transmission of the of the access code from the remote access device is based upon decryption of the encrypted access code via a second key of the asymmetric key pair, wherein further the controller comprises a trusted platform module (TPM) with a hash module, a key-hash message authentication code (HMAC) module, and a random number generator.

17. The system of claim 16, further comprising a proximity signal receiver to detect that a vehicle key has been locked in the vehicle, wherein the communication module is configured to transmit a text message to the cellular telephone upon detecting that the vehicle key as been locked in the vehicle.

18. The system of claim 16, wherein the controller is configured to authenticate a user of the cellular telephone via a personal identification number (PIN) or via an authentication phrase of a sound file stored in the controller.

19. The system of claim 16, wherein the controller is configured to stop the engine of the vehicle via manipulation of the vehicle device.

* * * * *